United States Patent
Komuro

(10) Patent No.: US 11,002,361 B2
(45) Date of Patent: May 11, 2021

(54) SHIFT CONTROL DEVICE

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 35 days.

(21) Appl. No.: 16/653,203

(22) Filed: Oct. 15, 2019

(65) Prior Publication Data

US 2020/0158236 A1 May 21, 2020

(30) Foreign Application Priority Data

Nov. 19, 2018 (JP) .............................. JP2018-216469

(51) Int. Cl.
*F16H 61/66* (2006.01)
*F16H 59/70* (2006.01)

(52) U.S. Cl.
CPC ....... *F16H 61/66* (2013.01); *F16H 2059/704* (2013.01); *F16H 2061/6615* (2013.01)

(58) Field of Classification Search
CPC ......... F16H 2059/366; F16H 2059/704; F16H 2061/6615; F16H 61/66; B60W 10/06; B60W 10/107
See application file for complete search history.

(56) References Cited

U.S. PATENT DOCUMENTS

| | | | |
|---|---|---|---|
| 7,548,810 B2 * | 6/2009 | Aoki | ................. F16H 61/66259 477/34 |
| 10,001,213 B2 * | 6/2018 | Sato | .................. F16H 61/66231 |
| 10,190,683 B2 * | 1/2019 | Kikkawa | ............... F16H 61/662 |
| 2005/0096822 A1 | 5/2005 | Aoki | |
| 2016/0097450 A1 * | 4/2016 | Sato | .................. F16H 61/66231 475/208 |
| 2016/0201798 A1 | 7/2016 | Kikkawa et al. | |

FOREIGN PATENT DOCUMENTS

| | | |
|---|---|---|
| JP | 2005-140174 A | 6/2005 |
| JP | 2010-7749 A | 1/2010 |
| WO | 2015/046353 A1 | 4/2015 |

* cited by examiner

*Primary Examiner* — David R Morris
(74) *Attorney, Agent, or Firm* — Troutman Pepper Hamilton Sanders LLP

(57) ABSTRACT

A shift control device has stepless and stepped shift modes in which a transmission gear ratio of a continuously variable transmission is controlled in stepless and stepwise fashions, respectively, and includes a mode setting unit that switches the shift mode to the stepped shift mode if an engine rotation speed in the stepless shift mode exceeds a switch threshold, a correction-value setting unit that sets a correction value based on the engine rotation speed if the shift mode is to be switched to the stepped shift mode, a shift-threshold setting unit that sets a shift threshold by adding the correction value to the switch threshold if the shift mode is to be switched to the stepped shift mode, and an upshift controller that switches the transmission gear ratio toward a higher side when the engine rotation speed in the stepped shift mode reaches the shift threshold.

16 Claims, 12 Drawing Sheets

SHIFT CONTROL DEVICE

CROSS-REFERENCE TO RELATED APPLICATIONS

The present application claims priority from Japanese Patent Application No. 2018-216469 filed on Nov. 19, 2018, the entire contents of which are hereby incorporated by reference.

BACKGROUND

The disclosure relates to shift control devices that control continuously variable transmissions.

Continuously variable transmissions having, for example, primary pulleys and secondary pulleys are known as transmissions installed in automobiles. Shift modes of continuously variable transmissions include a stepless shift mode in which the transmission gear ratio is controlled in a stepless fashion and a stepped shift mode in which the transmission gear ratio is controlled in a stepwise fashion (see Japanese Unexamined Patent Application Publication Nos. 2005-140174 and 2010-7749 and International Publication No. 2015/046353).

SUMMARY

An aspect of the disclosure provides a shift control device having a stepless shift mode and a stepped shift mode as shift modes for controlling a continuously variable transmission to be coupled to an engine. The stepless shift mode is a mode in which a transmission gear ratio of the continuously variable transmission is controlled in a stepless fashion, and the stepped shift mode is a mode in which the transmission gear ratio of the continuously variable transmission is controlled in a stepwise fashion. The shift control device includes a mode setting unit, a correction-value setting unit, a shift-threshold setting unit, and an upshift controller. The mode setting unit is configured to switch the shift mode from the stepless shift mode to the stepped shift mode if an engine rotation speed in the stepless shift mode exceeds a switch threshold. The correction-value setting unit is configured to set a correction value on a basis of the engine rotation speed if the shift mode is to be switched from the stepless shift mode to the stepped shift mode. The shift-threshold setting unit is configured to set a shift threshold by adding the correction value to the switch threshold if the shift mode is to be switched from the stepless shift mode to the stepped shift mode. The upshift controller is configured to switch the transmission gear ratio of the continuously variable transmission toward a higher side when the engine rotation speed in the stepped shift mode reaches the shift threshold.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
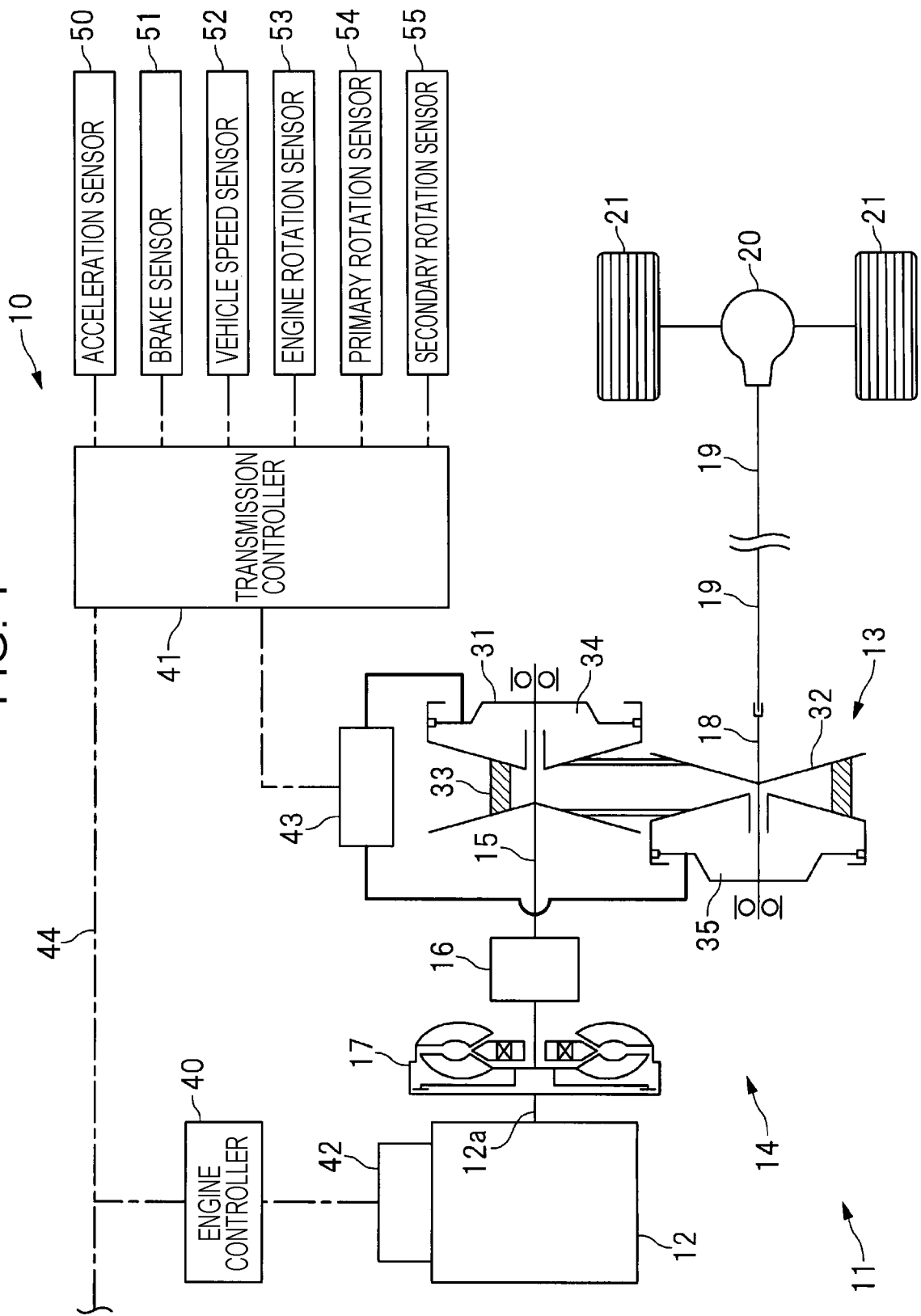
FIG. 1 schematically illustrates a vehicle equipped with a shift control device according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. When the accelerator pedal is pressed deeply while a vehicle is running in a stepless shift mode, the shift mode is switched from the stepless shift mode to the stepped shift mode, so that accelerated traveling using the stepped shift mode is executed. When the vehicle is to be accelerated in the stepped shift mode, the transmission gear ratio of the continuously variable transmission is switched toward the higher side every time the engine rotation speed reaches a predetermined shift threshold. When so-called kick-down control is executed as the accelerator pedal is pressed, the transmission gear ratio is quickly controlled toward the lower side so that the engine rotation speed increases quickly, possibly causing the engine rotation speed to significantly exceed the shift threshold mentioned above. When the shift mode is switched from the stepless shift mode to the stepped shift mode under such a condition, the continuously variable transmission is repeatedly upshifted many times until the engine rotation speed falls below the shift threshold. Since such repetitive upshifting in the stepped shift mode may give a sense of discomfort to the vehicle occupant or occupants, it is desirable that the stepped shift mode be performed appropriately.

It is desirable to appropriately execute the stepped shift mode.

[Vehicle Structure]

FIG. 1 schematically illustrates a vehicle 11 equipped with a shift control device 10 according to an embodiment of the disclosure. As illustrated in FIG. 1, the vehicle 11 is equipped with a power train 14 provided with an engine 12 and a continuously variable transmission 13. A primary shaft 15 as an input shaft of the continuously variable transmission 13 is coupled to the engine 12 via an advance-retract switching mechanism 16 and a torque converter 17. A secondary shaft 18 as an output shaft of the continuously variable transmission 13 is coupled to wheels 21 via, for example, a driving-wheel output shaft 19 and a differential mechanism 20. The advance-retract switching mechanism 16 for switching the rotational direction of the primary shaft 15 includes, for example, a clutch and a planetary pinion train (not illustrated).

The continuously variable transmission 13 has a primary pulley 31 provided on the primary shaft 15, a secondary pulley 32 provided on the secondary shaft 18, and a driving chain 33 wound around these pulleys 31 and 32. The primary pulley 31 is provided with a primary chamber 34, and the secondary pulley 32 is provided with a secondary chamber 35. By controlling the oil pressure supplied to the primary chamber 34 and the secondary chamber 35, the groove widths of the primary pulley 31 and the secondary pulley 32 can be adjusted. Accordingly, the diameter of the driving chain 33 wound around the pulleys 31 and 32 can be changed, so that the transmission gear ratio of the continuously variable transmission 13 can be controlled.

[Control System]

A control system of the power train 14 will now be described. As illustrated in FIG. 1, the vehicle 11 is provided with an engine controller 40 and a transmission controller 41 that are constituted of, for example, microcomputers. The engine controller 40 outputs a control signal to an engine auxiliary unit 42, such as an injector, an igniter, and a throttle valve, to control the running mode of the engine 12. The transmission controller 41 outputs a control signal to a valve unit 43, constituted of a plurality of electromagnetic valves and oil passages, to control the operational modes of, for example, the continuously variable transmission 13, the advance-retract switching mechanism 16, and the torque converter 17. Hydraulic oil discharged from an oil pump (not illustrated) is pressure-controlled via the valve unit 43 and is subsequently supplied to oil chambers included in, for example, the continuously variable transmission 13 and the torque converter 17.

These controllers 40 and 41 are coupled to each other in a communicable manner via an in-vehicle network 44, such as either one of a controller area network (CAN) and a local interconnect network (LIN). The transmission controller 41 is coupled to an acceleration sensor 50 that detects an accelerator-pedal operated amount (referred to as "accelerator opening AP" hereinafter), a brake sensor 51 that detects a brake-pedal operated amount, and a vehicle speed sensor 52 that detects a vehicle speed VSP indicating the traveling speed of the vehicle 11. Furthermore, the transmission controller 41 is coupled to, for example, an engine rotation sensor 53 that detects an engine rotation speed Ne as a rotation speed of a crankshaft 12a, a primary rotation sensor 54 that detects a primary rotation speed as a rotation speed of the primary pulley 31, and a secondary rotation sensor 55 that detects a secondary rotation speed as a rotation speed of the secondary pulley 32.

[Shift Control of Continuously Variable Transmission]

Figure 2:
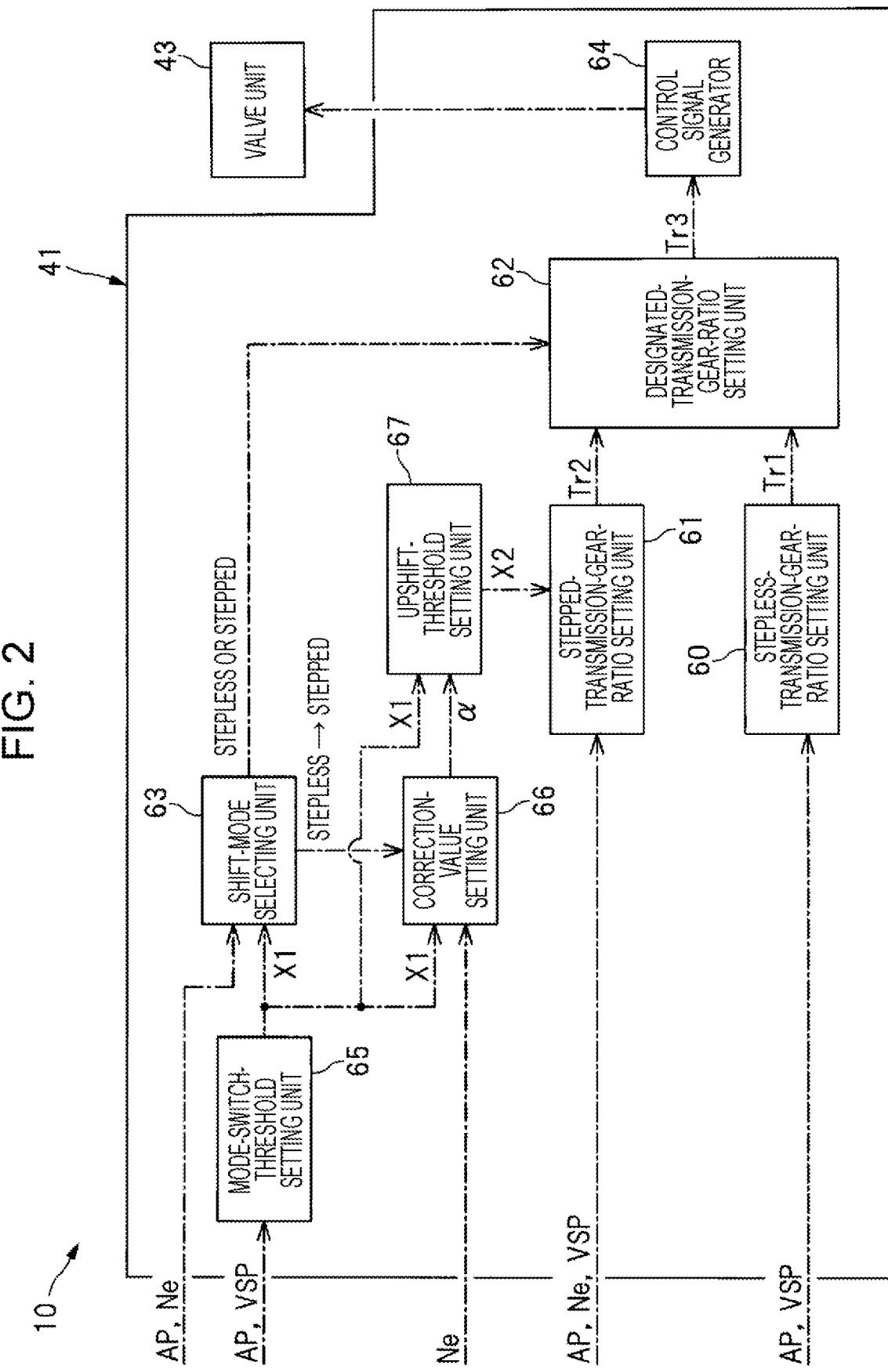
FIG. 2 is a block diagram illustrating a configuration example of a transmission controller.
Figure 3:
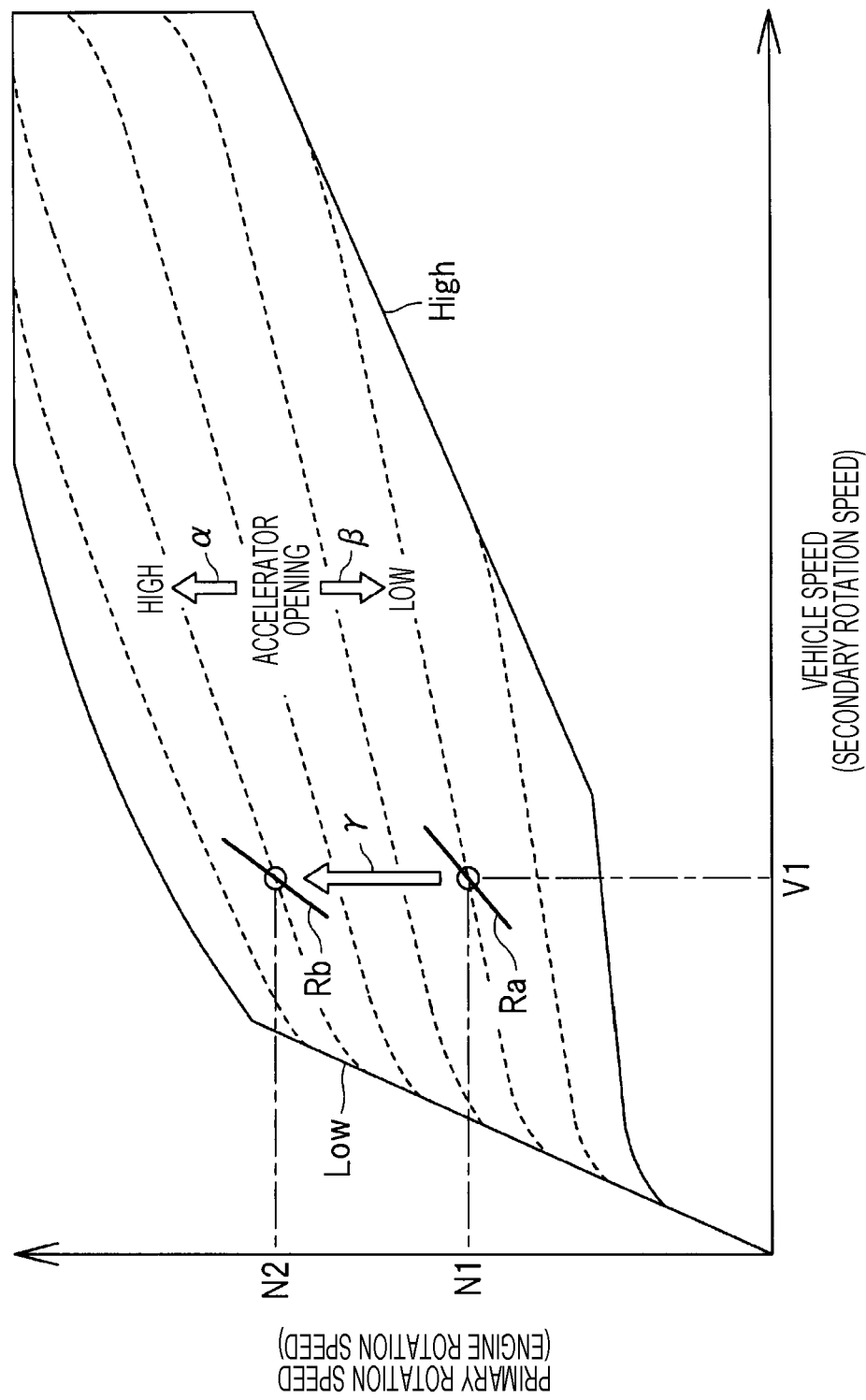
FIG. 3 illustrates an example of a shift situation when a stepless shift mode is used.
Figure 4:
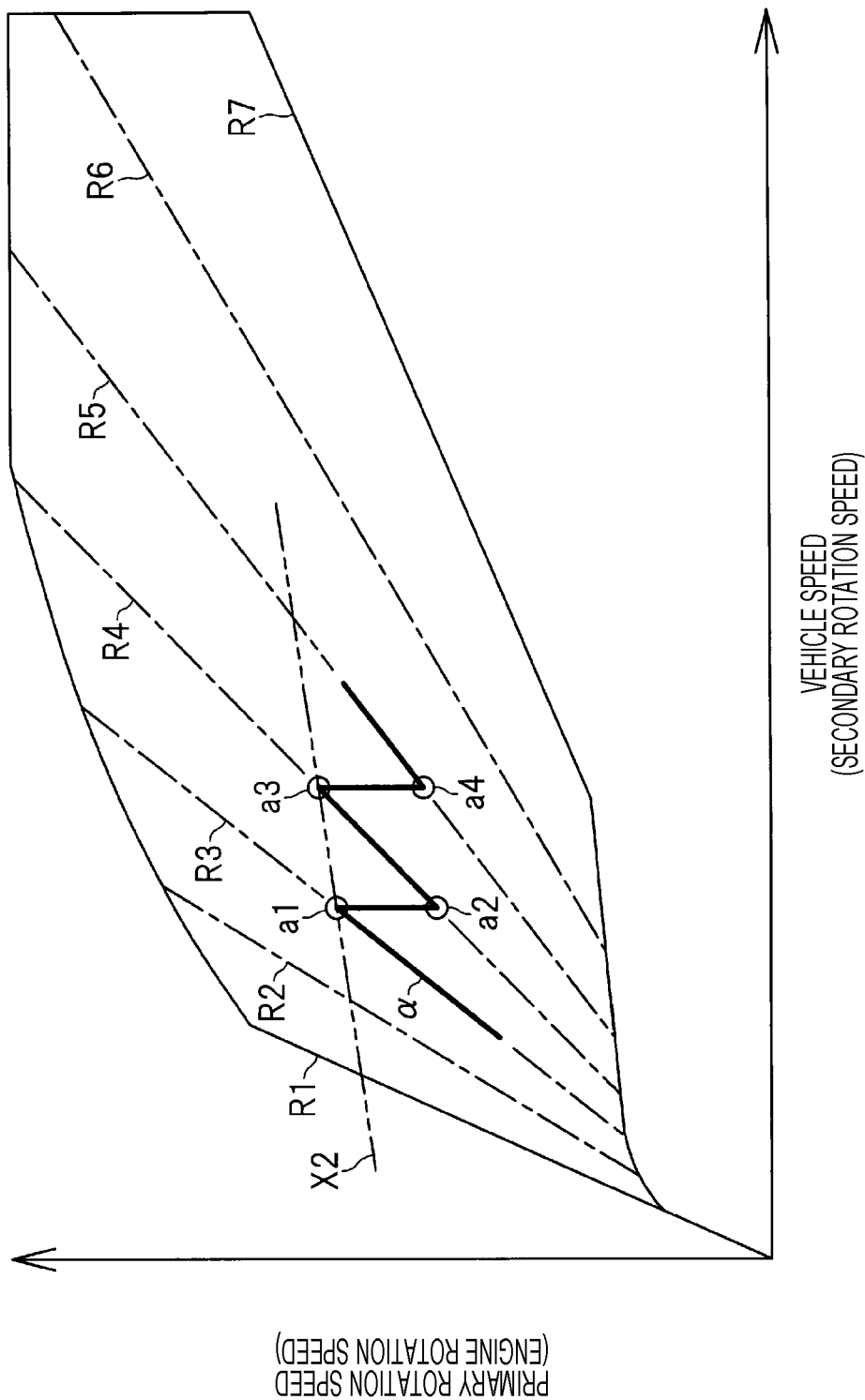
FIG. 4 illustrates an example of a shift situation when a stepped shift mode is used.

Shift control of the continuously variable transmission 13 will now be described. FIG. 2 is a block diagram illustrating a configuration example of the transmission controller 41. FIG. 3 illustrates an example of a shift situation when the stepless shift mode is used. FIG. 4 illustrates an example of a shift situation when the stepped shift mode is used.

As shift modes of the continuously variable transmission 13, the shift control device 10 has a stepless shift mode in which the transmission gear ratio is controlled in a stepless fashion and a stepped shift mode in which the transmission gear ratio is controlled in a stepwise fashion. Thus, as illustrated in FIG. 2, the transmission controller 41 has a stepless-transmission-gear-ratio setting unit 60 that sets a target transmission gear ratio Tr1 to be used in the stepless shift mode and a stepped-transmission-gear-ratio setting unit 61 that sets a target transmission gear ratio Tr2 to be used in the stepped shift mode. In one embodiment, the stepped-transmission-gear-ratio setting unit 61 may serve as an "upshift controller".

The stepless-transmission-gear-ratio setting unit 60 refers to a shift characteristic map based on the accelerator opening AP and the vehicle speed VSP and sets the target transmission gear ratio Tr1 to be used in the stepless shift mode. As illustrated in FIG. 3, a characteristic line Low indicating a lower-side maximum transmission gear ratio and a characteristic line High indicating a higher-side minimum transmission gear ratio are set in the shift characteristic map. Furthermore, as indicated by dashed lines, a plurality of characteristic lines corresponding to the accelerator opening AP as the operated amount of the accelerator pedal are set in the shift characteristic map. As the accelerator opening AP increases, that is, as the requested driving force with respect to the vehicle 11 increases, a characteristic line in the direction of an arrow α is selected. On the other hand, as the accelerator opening AP decreases, that is, as the requested driving force with respect to the vehicle 11 decreases, a characteristic line in the direction of an arrow β is selected. For example, as illustrated by an arrow γ, if the accelerator pedal is pressed while the vehicle 11 is traveling at a vehicle speed V1, the target primary rotation speed is increased from N1 to N2 as a result of selection of a new characteristic line, and the target transmission gear ratio Tr1 is continuously controlled from "Ra" to "Rb" at the lower side. Accordingly, in the stepless shift mode, the target transmission gear ratio Tr1 is updated while changing in a continuous fashion, that is, in a stepless fashion.

The stepped-transmission-gear-ratio setting unit 61 refers to the shift characteristic map (not illustrated) based on the accelerator opening AP and the vehicle speed VSP and sets the target transmission gear ratio Tr2 to be used in the stepped shift mode. As illustrated in FIG. 4, for example, seven fixed transmission gear ratios R1 to R7 are each set in advance as the target transmission gear ratio Tr2 in the stepped shift mode. As indicated by a thick line α in FIG. 4, when the engine rotation speed Ne reaches an upshift threshold X2 (reference sign a1), to be described later, during acceleration using the third fixed transmission gear ratio R3, the target transmission gear ratio Tr2 is switched to the fourth fixed transmission gear ratio R4 (reference sign a2). In one embodiment, the upshift threshold X2 may serve as a "shift threshold". Subsequently, when the engine rotation speed Ne reaches the upshift threshold X2 (reference sign a3) during acceleration using the fourth fixed transmission gear ratio R4, the target transmission gear ratio Tr2 is switched to the fifth fixed transmission gear ratio R5 (reference sign a4). Accordingly, in the stepped shift mode, the target transmission gear ratio Tr2 is selected from the fixed transmission gear ratios R1 to R7, such that the target transmission gear ratio Tr2 is switched in a stepwise fashion.

As illustrated in FIG. 2, the transmission controller 41 has a designated-transmission-gear-ratio setting unit 62 that sets a designated transmission gear ratio Tr3 and a shift-mode selecting unit 63 that selects either one of the stepless shift mode and the stepped shift mode as the shift mode. In one embodiment, the shift-mode selecting unit 63 may serve as a "mode setting unit". As will be described later, the shift-mode selecting unit 63 selects the shift mode (i.e., either one of the stepless shift mode and the stepped shift mode) based on, for example, the accelerator opening AP, and outputs the selected shift mode to the designated-transmission-gear-ratio setting unit 62. Then, the designated-transmission-gear-ratio setting unit 62 sets the designated transmission gear ratio Tr3 as the ultimate control target based on the selection result of the shift mode.

In one example, when the stepless shift mode is selected as the shift mode, the designated-transmission-gear-ratio setting unit 62 sets the target transmission gear ratio Tr1 from the stepless-transmission-gear-ratio setting unit 60 as the designated transmission gear ratio Tr3. On the other hand, when the stepped shift mode is selected as the shift mode, the designated-transmission-gear-ratio setting unit 62 sets the target transmission gear ratio Tr2 from the stepped-transmission-gear-ratio setting unit 61 as the designated transmission gear ratio Tr3. Then, a control signal generator 64 coupled to the designated-transmission-gear-ratio setting unit 62 generates a control signal based on the designated transmission gear ratio Tr3 and outputs this control signal to the valve unit 43. The valve unit 43 adjusts the pressure of hydraulic oil supplied to the primary chamber 34 and the secondary chamber 35, and controls the transmission gear ratio of the continuously variable transmission 13 toward the designated transmission gear ratio Tr3.

[Shift-Mode Switching Control (General Outline)]

Figure 5:
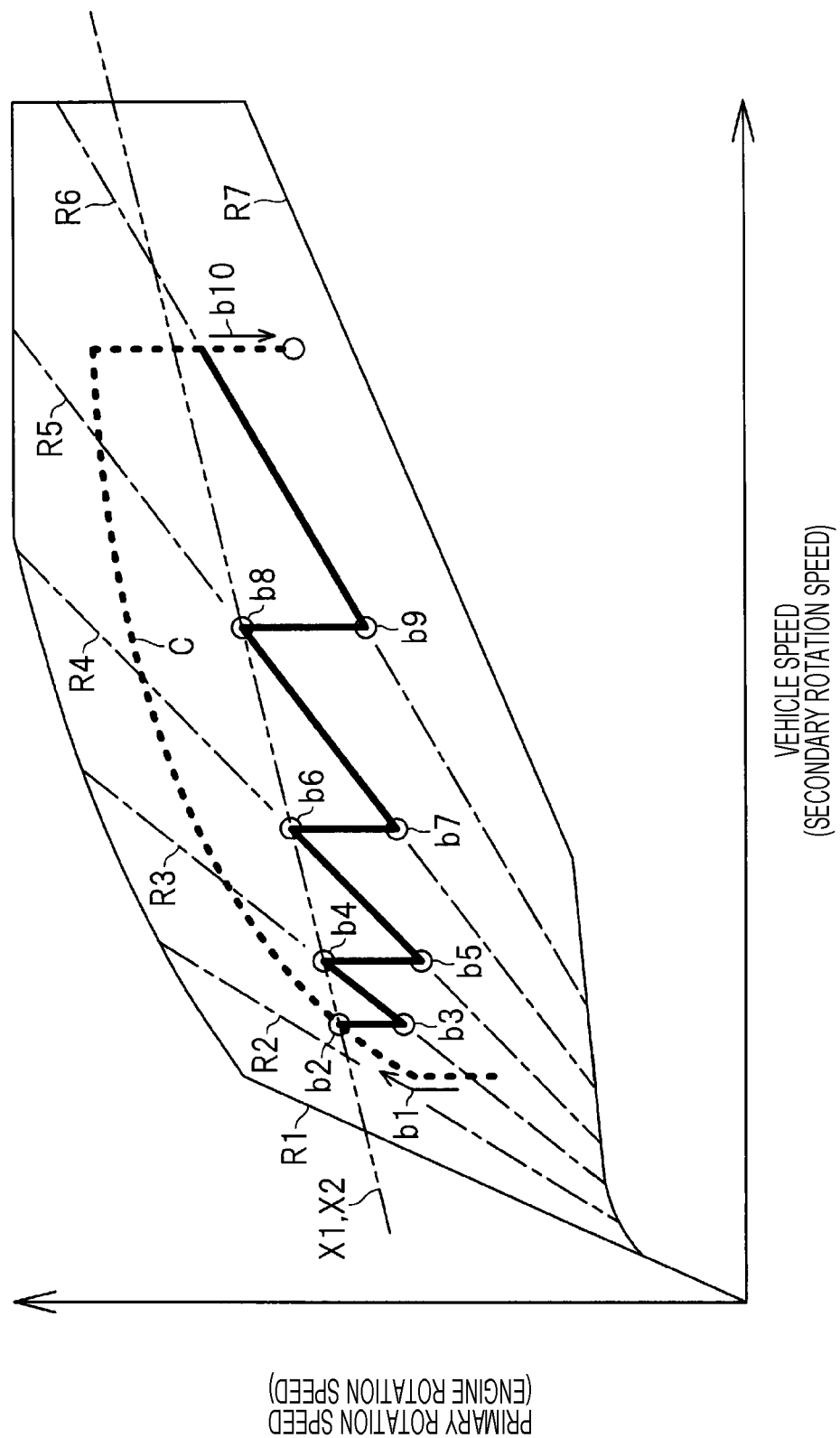
FIG. 5 illustrates an example of a shift situation involving switching of shift modes.
Figure 6:
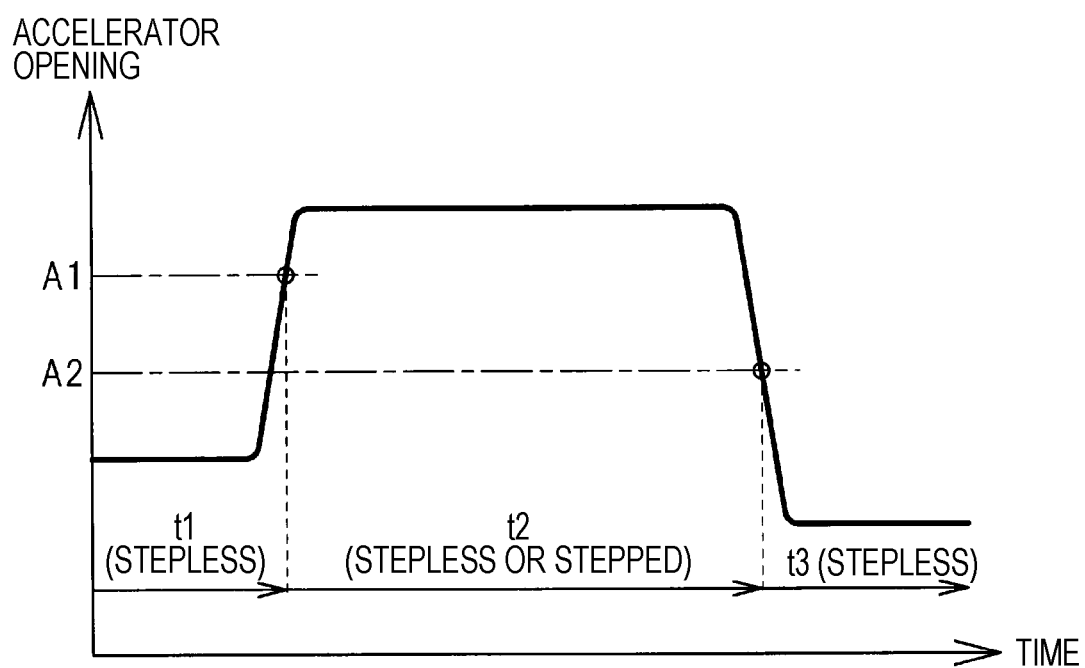
FIG. 6 illustrates an example where an accelerator pedal is operated in the shift situation illustrated in FIG. 5.

The following description relates to switching of the shift mode from the stepless shift mode to the stepped shift mode performed by the transmission controller 41. FIG. 5 illustrates an example of a shift situation involving switching of shift modes. In FIG. 5, the shift situation according to the stepless shift mode is indicated by a dashed line, and the shift situation according to the stepped shift mode is indicated by a solid line. FIG. 6 illustrates an example where the accelerator pedal is operated in the shift situation illustrated in FIG. 5.

As mentioned above, the shift-mode selecting unit 63 of the transmission controller 41 selects either one of the stepless shift mode and the stepped shift mode as a shift mode to be executed based on, for example, the accelerator opening AP. A condition for switching the shift mode from the stepless shift mode to the stepped shift mode is a condition in which the accelerator opening AP exceeds a predetermined opening threshold A1 and the engine rotation speed Ne exceeds a predetermined mode-switch threshold X1. In one embodiment, the opening threshold A1 and the mode-switch threshold X1 may serve as an "operation threshold" and a "switch threshold" respectively. In one example, if the accelerator pedal is pressed deeply in the stepless shift mode, the shift mode is switched from the stepless shift mode to the stepped shift mode. A condition for switching the shift mode from the stepped shift mode to the stepless shift mode is a condition in which the accelerator opening AP falls below an opening threshold A2 that is lower than the opening threshold A1. In one example, if the accelerator pedal is released from the pressed state in the stepped shift mode, the shift mode is switched from the stepped shift mode to the stepless shift mode.

In one example, as indicated by a reference sign t1 in FIG. 6, the stepless shift mode is selected as the shift mode until the accelerator opening AP reaches the opening threshold A1. Furthermore, as indicated by a reference sign t2, until the accelerator opening AP falls below the opening threshold A2 from when the accelerator opening AP exceeds the opening threshold A1, if the engine rotation speed Ne reaches the mode-switch threshold X1, as will be described later, the shift mode is switched from the stepless shift mode to the stepped shift mode. Moreover, as indicated by a reference sign t3, when the accelerator opening AP falls below the opening threshold A2, the stepless shift mode is selected as the shift mode.

As indicated by an arrow b1 in FIG. 5, when the accelerator pedal is pressed deeply in the stepless shift mode, so-called kick-down control is executed for quickly accelerating the vehicle 11, so that the target transmission gear ratio Tr1 is quickly controlled toward the lower side and the engine rotation speed Ne is quickly increased. In this case, a situation where the accelerator pedal is operated is a situation where the accelerator pedal is pressed by the vehicle occupant and the accelerator opening AP exceeds the opening threshold A1. Subsequently, when the engine rotation speed Ne reaches the predetermined mode-switch threshold X1 (reference sign b2), the condition for switching the shift mode to the stepped shift mode is satisfied, so that the shift mode is switched from the stepless shift mode to the stepped shift mode and upshifting to the third fixed transmission gear ratio R3 as a closest fixed transmission gear ratio is performed (reference sign b3).

In subsequent acceleration, every time the engine rotation speed Ne reaches the upshift threshold X2 (reference signs b4, b6, and b8), to be described later, the continuously variable transmission 13 is upshifted to the higher fixed transmission gear ratios R4 to R6 (reference signs b5, b7, and b9). Then, when the accelerator pedal is released from the pressed state, the condition for switching the shift mode to the stepless shift mode is satisfied, so that the shift mode is switched from the stepped shift mode to the stepless shift mode, as indicated by an arrow b10, whereby the stepless transmission gear ratio is controlled toward the higher side and the engine rotation speed Ne is gradually decreased. Although the mode-switch threshold X1 and the upshift threshold X2 are equal to each other in the example illustrated in FIG. 5, the example is not limited to this. A process for setting the mode-switch threshold X1 and the upshift threshold X2 will be described later.

As described above, when the accelerator pedal is deeply pressed during traveling in the stepless shift mode, the shift mode is switched from the stepless shift mode to the stepped shift mode. Accordingly, when the vehicle 11 is to be accelerated, the manners in which the engine rotation speed and the vehicle speed are increased can be made proportional to each other, so that the vehicle 11 can be accelerated without giving a sense of discomfort to the vehicle occupant or occupants. Furthermore, as indicated by a dashed line C in FIG. 5, if the vehicle 11 is accelerated while the stepless shift mode is maintained, the engine rotation speed tends to remain high. However, by switching the shift mode from the stepless shift mode to the stepped shift mode, the vehicle 11 can be accelerated while decreasing the engine rotation speed. By decreasing the engine rotation speed in this manner, noise and loss of the power train 14 can be reduced.

[Process for Setting Thresholds X1 and X2]

Next, the process for setting the mode-switch threshold X1 and the upshift threshold X2 will be described. As illustrated in FIG. 2, in order to set the mode-switch threshold X1 and the upshift threshold X2, the transmission controller 41 has a mode-switch threshold setting unit 65 that sets the mode-switch threshold X1, a correction-value setting unit 66 that sets a correction value α, and an upshift-threshold setting unit (shift-threshold setting unit) 67 that sets the upshift threshold X2. In one embodiment, the mode-switch threshold setting unit 65 and the upshift-threshold setting unit 67 may serve as a "switch-threshold setting unit" and a "shift-threshold setting unit" respectively.

Figure 7:
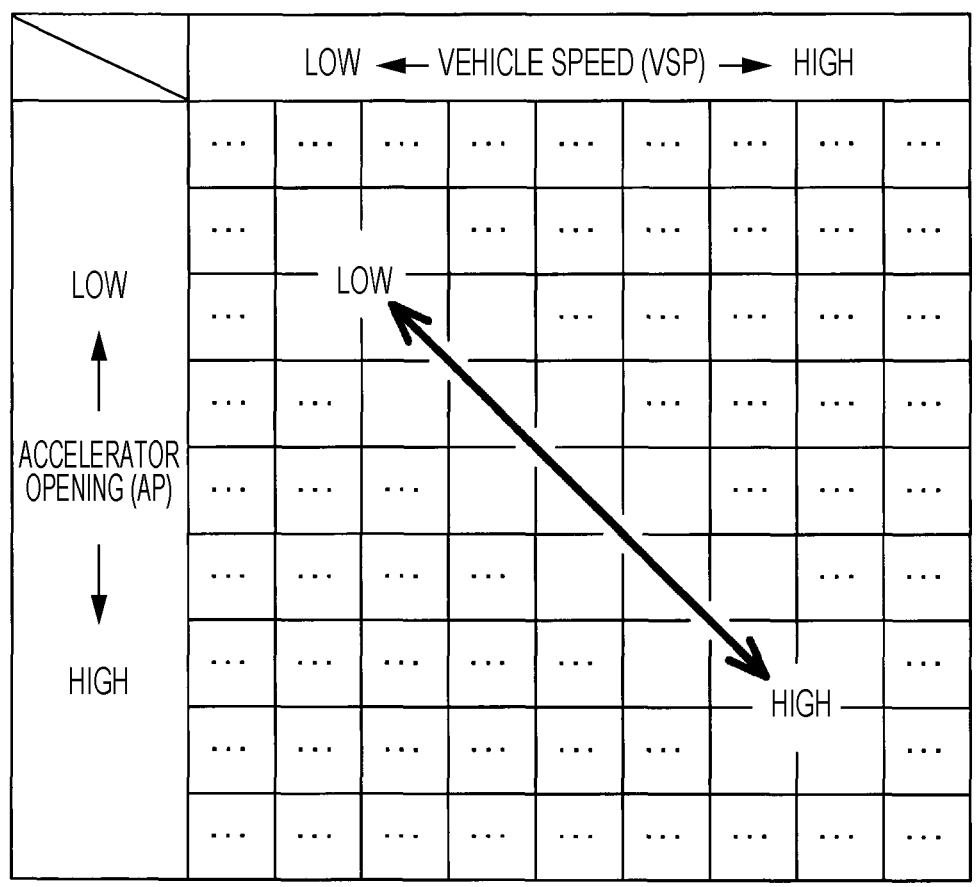
FIG. 7 illustrates an example of a mode-switch threshold.

The mode-switch threshold setting unit 65 sets the mode-switch threshold X1 for every predetermined calculation period based on the accelerator opening AP and the vehicle speed VSP. FIG. 7 illustrates an example of the mode-switch threshold X1. As illustrated in FIG. 7, the mode-switch threshold X1 is set to a lower value as the accelerator opening AP decreases, whereas the mode-switch threshold X1 is set to a higher value as the accelerator opening AP increases. Furthermore, the mode-switch threshold X1 is set to a lower value as the vehicle speed VSP decreases, whereas the mode-switch threshold X1 is set to a higher value as the vehicle speed VSP increases.

As illustrated in FIG. 2, the correction-value setting unit 66 sets the correction value α based on the mode-switch threshold X1 and the engine rotation speed Ne when the shift mode is switched from the stepless shift mode to the stepped shift mode. In one example, when information about switching from the stepless shift mode to the stepped shift mode is transmitted by the shift-mode selecting unit 63, the correction-value setting unit 66 subtracts the mode-switch threshold X1 from the engine rotation speed Ne to calculate the correction value α. In other words, when the condition for switching the shift mode from the stepless shift mode to the stepped shift mode is satisfied as a result of the increasing engine rotation speed Ne reaching the mode-switch threshold X1, the correction-value setting unit 66 calculates the correction value α by subtracting the mode-switch threshold X1 from the engine rotation speed Ne immediately before the upshifting.

When the correction value α is set by the correction-value setting unit 66 in this manner, the upshift-threshold setting unit 67 adds the correction value α to the mode-switch threshold X1 to set the upshift threshold X2 for every predetermined calculation period. In one example, the upshift-threshold setting unit 67 adds the correction value α, set when the shift mode is switched to the stepped shift mode, to the mode-switch threshold X1 that is updated for every predetermined calculation period, so that the upshift threshold X2 is updated for every predetermined calculation period. The correction value α set when the shift mode is switched to the stepped shift mode is maintained at the same value until the stepped shift mode ends and the shift mode is switched to the stepless shift mode.

As illustrated in FIG. 7, the mode-switch threshold X1 is set to a lower value as the accelerator opening AP decreases, whereas the mode-switch threshold X1 is set to a higher value as the accelerator opening AP increases. Furthermore, the mode-switch threshold X1 is set to a lower value as the vehicle speed VSP decreases, whereas the mode-switch threshold X1 is set to a higher value as the vehicle speed VSP increases. Accordingly, in regions where the accelerator opening AP and the vehicle speed VSP are high, the mode-switch threshold X1 is set to a higher value, so that the upshift value X2 is also set to a higher value. Accordingly, upshifting can be suppressed in regions where the accelerator opening AP and the vehicle speed VSP are high, so that the driving force when the vehicle 11 is accelerated in the stepped shift mode can be ensured.

[Shift-Mode Switching Control (Details)]
(Flowchart)

Figure 8:
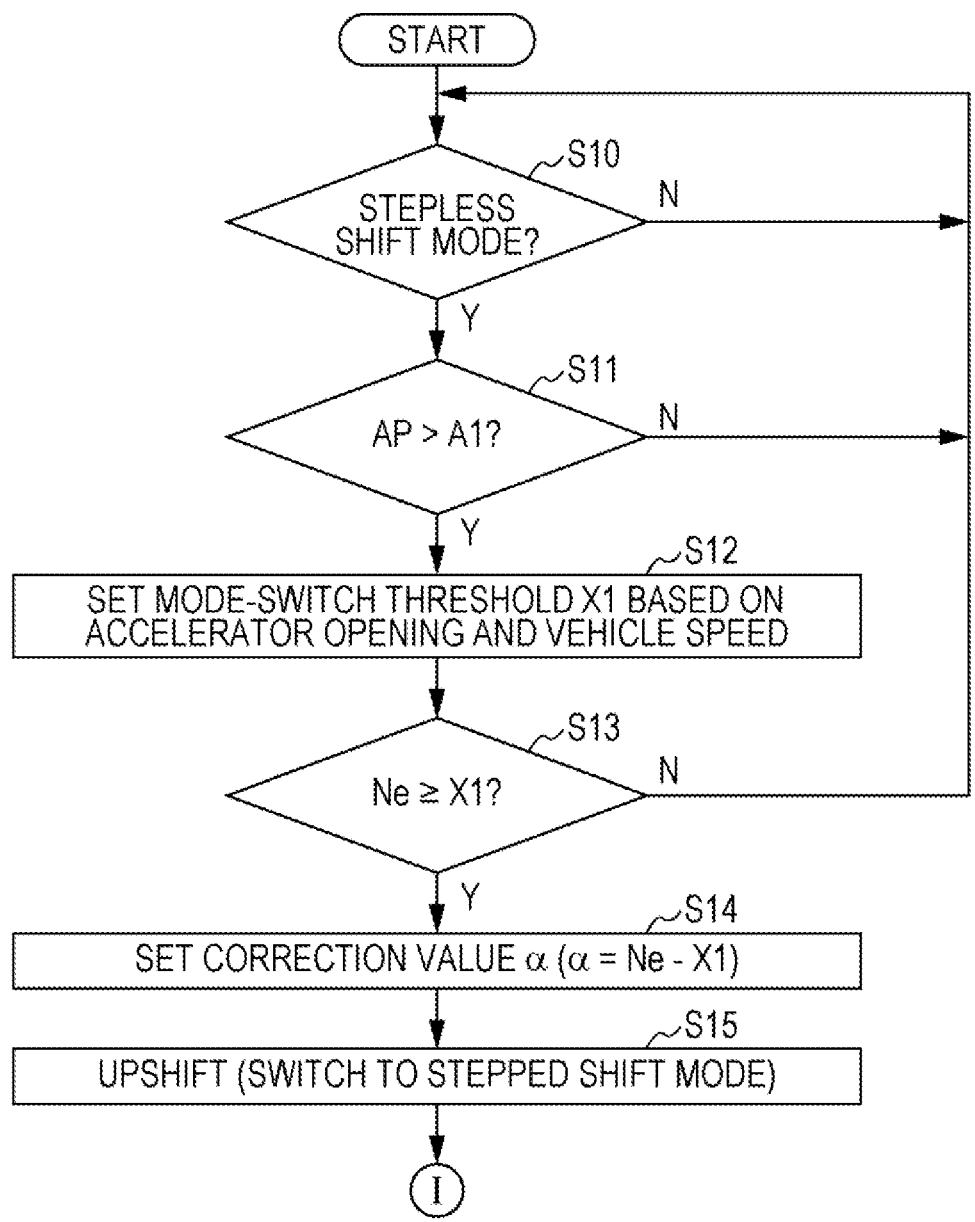
FIG. 8 is a flowchart illustrating an example of a shift-mode switching process.
Figure 9:
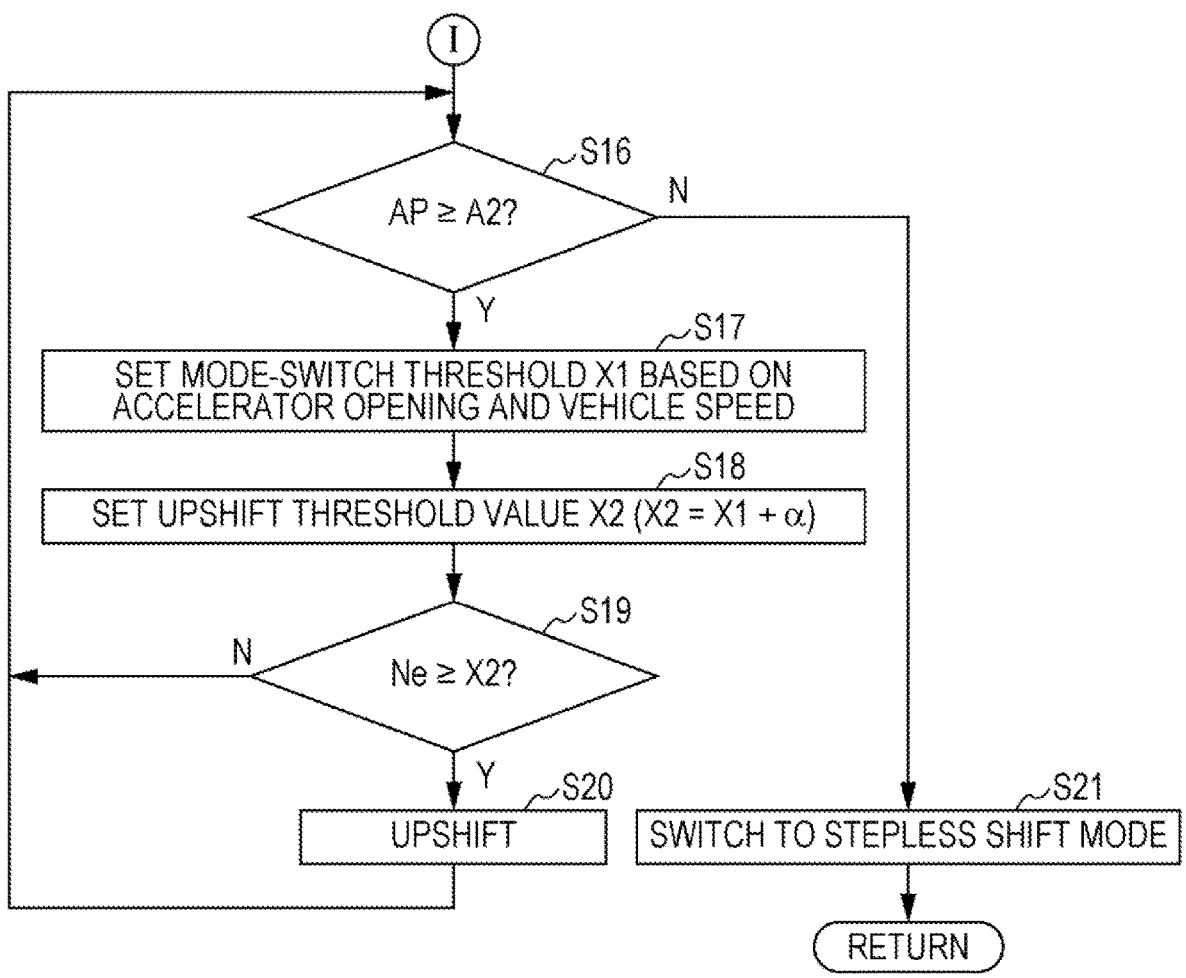
FIG. 9 is a flowchart illustrating an example of the shift-mode switching process.

Next, the switching from the stepless shift mode to the stepped shift mode performed by the transmission controller 41 will be described. As mentioned above, if the accelerator opening AP exceeds the opening threshold A1 during the stepless shift mode and the engine rotation speed Ne exceeds the mode-switch threshold X1, the shift mode is switched from the stepless shift mode to the stepped shift mode. Moreover, if the accelerator opening AP falls below the opening threshold A2 during the stepped shift mode, the shift mode is switched from the stepped shift mode to the stepless shift mode. FIG. 8 and FIG. 9 are flowcharts illustrating an example of a shift-mode switching process. The flowcharts illustrated in FIG. 8 and FIG. 9 are connected at the part indicated by a reference sign A. The shift-mode switching process will be described below with reference to the flowcharts.

As illustrated in FIG. 8 and FIG. 9, it is determined in step S10 whether the current shift mode is the stepless shift mode. If it is determined in step S10 that the current shift mode is the stepless shift mode, the process proceeds to step S11 where it is determined whether the accelerator opening AP exceeds the opening threshold A1. If it is determined in step S11 that the accelerator opening AP exceeds the opening threshold A1, the process proceeds to step S12 where the mode-switch threshold X1 is set based on the accelerator opening AP and the vehicle speed VSP. In step S13, it is determined whether the engine rotation speed Ne is higher than or equal to the mode-switch threshold X1.

If it is determined in step S13 that the engine rotation speed Ne is higher than or equal to the mode-switch threshold X1, that is, if it is determined that the engine rotation speed Ne has reached the mode-switch threshold X1 and that the condition for switching the shift mode to the stepped shift mode is satisfied, the process proceeds to step S14 where the mode-switch threshold X1 is subtracted from the engine rotation speed Ne so that the correction value α is set. When the correction value α is set in this manner, the process proceeds to step S15 where the transmission gear ratio of the continuously variable transmission 13 is upshifted to the higher side and the shift mode is switched from the stepless shift mode to the stepped shift mode.

Then, in step S16, it is determined whether the accelerator opening AP is higher than or equal to the opening threshold A2. If the accelerator opening AP is higher than or equal to the opening threshold A2 in step S16, that is, if the condition for executing the stepped shift mode is maintained, the process proceeds to step S17 where the mode-switch threshold X1 is updated based on the accelerator opening AP and the vehicle speed VSP. Then, in step S18, the upshift threshold X2 is set by adding the correction value α to the mode-switch threshold X1. In step S19, it is determined whether the engine rotation speed Ne is higher than or equal to the upshift threshold X2.

If it is determined in step S19 that the engine rotation speed Ne is higher than or equal to the upshift threshold X2, that is, if the engine rotation speed Ne has reached the upshift threshold X2, the process proceeds to step S20 where the transmission gear ratio is upshifted toward the higher side. Accordingly, in the stepped shift mode, the upshift threshold X2 is updated for every predetermined calculation period, and the transmission gear ratio is switched to the higher fixed transmission gear ratios R3 to R7 every time the engine rotation speed Ne reaches the upshift threshold X2. If it is determined in step S16 that the accelerator opening AP falls below the opening threshold A2, that is, if the condition for switching from the stepped shift mode to the stepless shift mode is satisfied, the process proceeds to step S21 where the shift mode is switched to the stepless shift mode.

Shift Situation: First Embodiment

Figure 10:
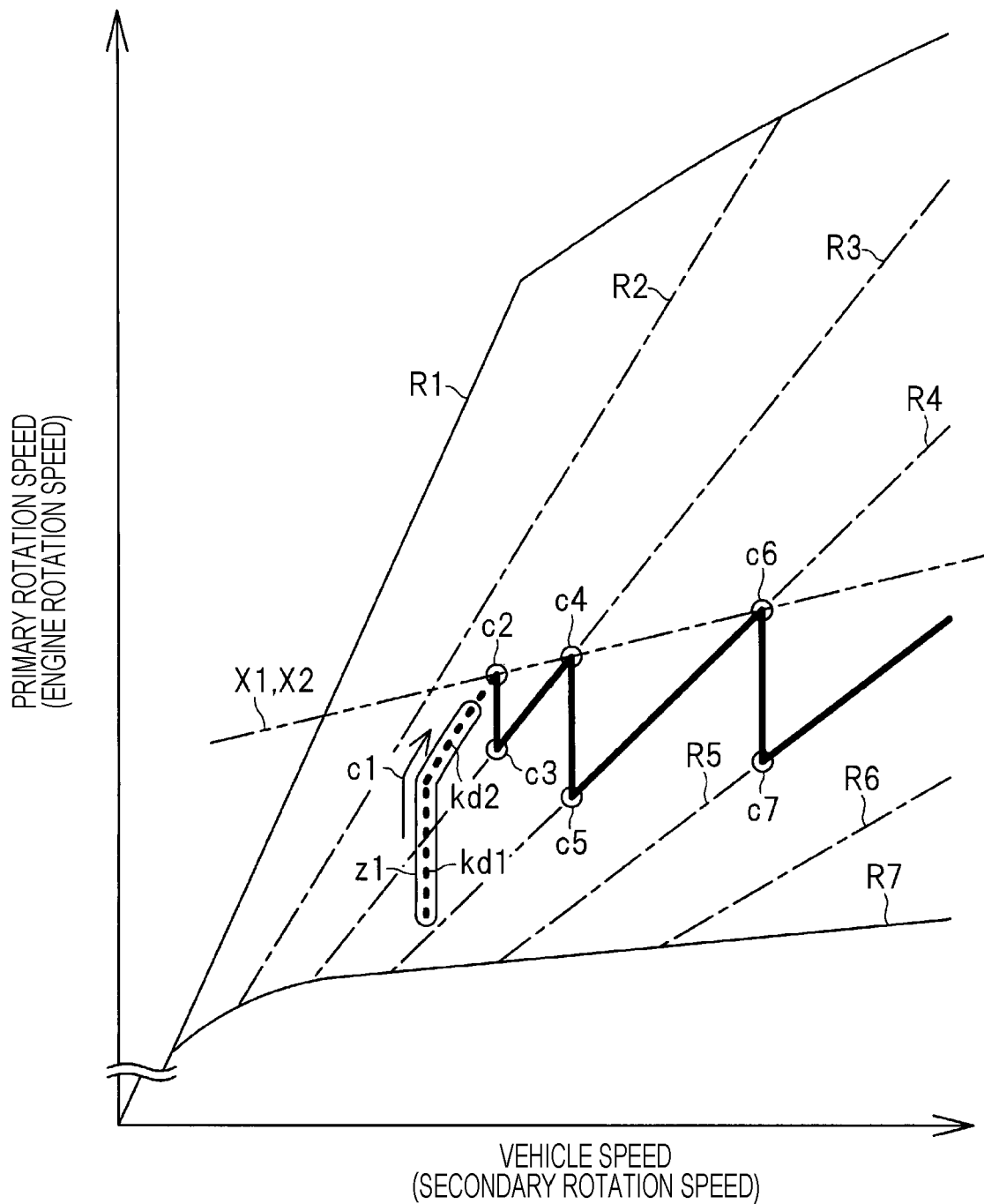
FIG. 10 illustrates an example of a shift situation when the shift mode is switched from the stepless shift mode to the stepped shift mode, in accordance with a first embodiment.

FIG. 10 illustrates an example of a shift situation when the shift mode is switched from the stepless shift mode to the stepped shift mode, in accordance with a first embodiment. In FIG. 10, the shift situation according to the stepless shift mode is indicated by a dashed line, and the shift situation according to the stepped shift mode is indicated by a solid line.

As indicated by an arrow c1 in FIG. 10, when the accelerator pedal is pressed deeply in the stepless shift mode, so-called kick-down control is executed for quickly accelerating the vehicle 11, so that the engine rotation speed Ne is quickly increased while the transmission gear ratio is quickly controlled toward the lower side. This kick-down control includes first control kd1 in which the transmission gear ratio is quickly controlled toward the lower side and second control kd2 in which the vehicle speed is increased while the transmission gear ratio is maintained. From the standpoint of increasing the stability of transmission control, the transmission controller 41 prohibits switching from the stepless shift mode to the stepped shift mode in an initial stage z1 of kick-down control indicated by an area surrounded by a solid line. In one example, the transmission controller 41 prohibits switching of the shift mode to the stepped shift mode until a predetermined time period elapses from when a transition is made to the second control kd2. A situation where kick-down control is executed is a situation where the accelerator pedal is pressed by the vehicle occupant and the accelerator opening AP exceeds the opening threshold A1.

Subsequently, when acceleration from the kick-down control continues and the engine rotation speed Ne reaches the mode-switch threshold X1 (reference sign c2), the transmission gear ratio is switched to the third fixed transmission gear ratio R3 (reference sign c3), and the shift mode is switched from the stepless shift mode to the stepped shift mode. In the example illustrated in FIG. 10, the engine rotation speed Ne reaches the mode-switch threshold X1 (reference sign c2) upon completion of the initial stage z1 of the kick-down control, and the shift mode is switched to the stepped shift mode (reference sign c3). In one example, at the point when the condition for switching the shift mode to the stepped shift mode is satisfied, the engine rotation speed Ne matches the mode-switch threshold X1, and the correction value α obtained as a result of subtracting the mode-switch threshold X1 from the engine rotation speed Ne is set to "0". Accordingly, since the correction value α is set to "0", the upshift threshold X2 calculated using this correction value α is set to the same value as the mode-switch threshold X1. In the subsequent stepped shift mode, upshifting to the higher fixed transmission gear ratios R4 and R5 is performed (reference signs c5 and c7) every time the engine rotation speed Ne reaches the upshift threshold X2 (reference signs c4 and c6).

Shift Situation: Second Embodiment

Figure 11:
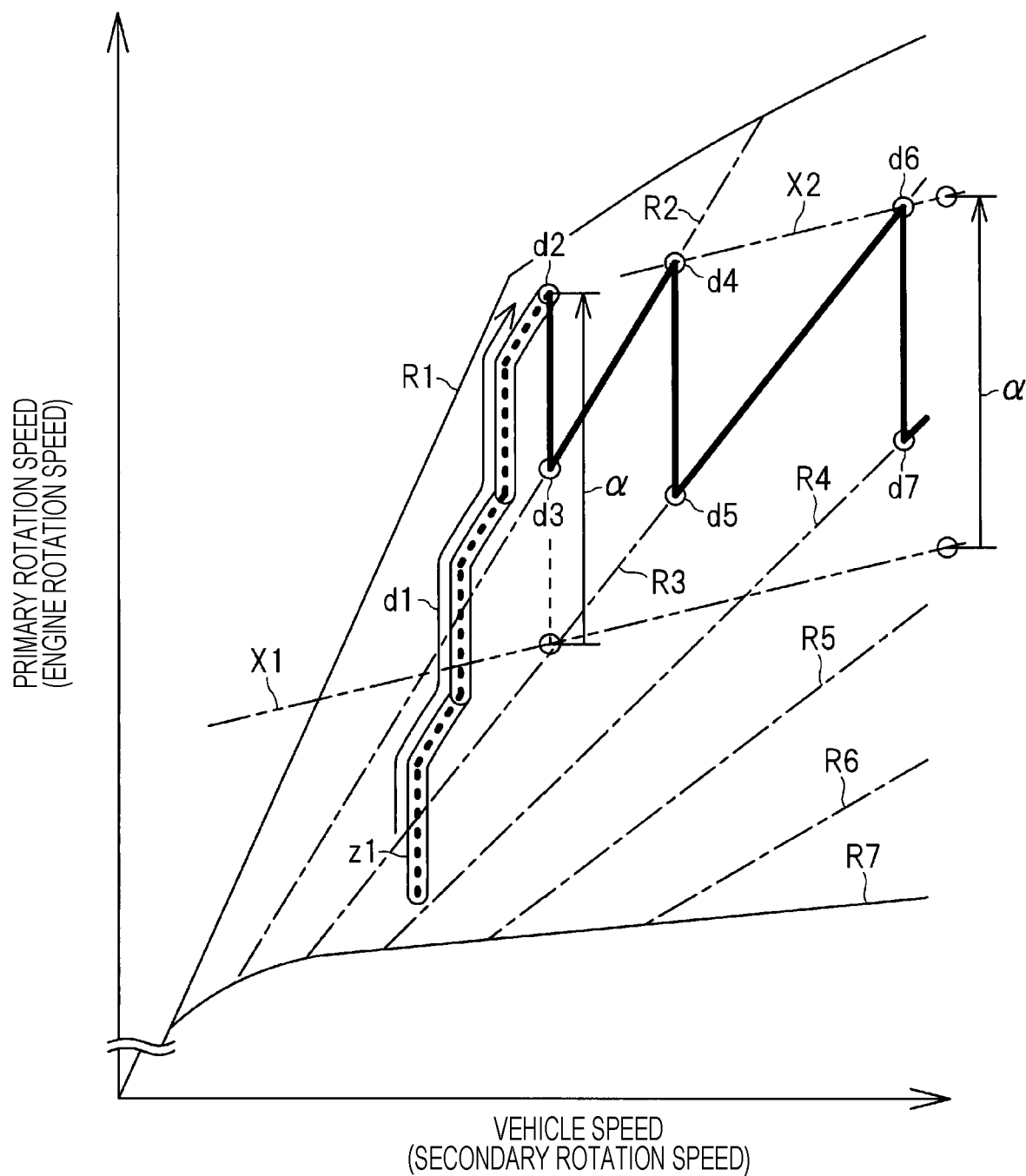
FIG. 11 illustrates an example of a shift situation when the shift mode is switched from the stepless shift mode to the stepped shift mode, in accordance with a second embodiment.

FIG. 11 illustrates an example of a shift situation when the shift mode is switched from the stepless shift mode to the stepped shift mode, in accordance with a second embodiment. In FIG. 11, the shift situation according to the stepless shift mode is indicated by a dashed line, and the shift situation according to the stepped shift mode is indicated by a solid line.

As indicated by an arrow d1 in FIG. 11, when the accelerator pedal is pressed deeply in the stepless shift mode, kick-down control is executed for quickly accelerating the vehicle 11, so that the engine rotation speed Ne is quickly increased while the transmission gear ratio is quickly controlled toward the lower side. In the example illustrated in FIG. 11, the accelerator pedal is pressed multiple times within a short period of time, and the initial stage z1 of the kick-down control is continued over multiple times. Therefore, even in a situation where the engine rotation speed Ne exceeds the mode-switch threshold X1, the stepless shift mode is maintained without the shift mode being changed. A situation where kick-down control is executed is a situation where the accelerator pedal is pressed by the vehicle occupant and the accelerator opening AP exceeds the opening threshold A1.

Subsequently, when the pressing of the accelerator pedal is kept constant and the initial stage z1 of the kick-down control ends (reference sign d2), the engine rotation speed Ne exceeds the mode-switch threshold X1. In one example, because the condition for switching the shift mode to the stepped shift mode is satisfied, the transmission gear ratio is switched to the second fixed transmission gear ratio R2 (reference sign d3), and the shift mode is switched from the stepless shift mode to the stepped shift mode. Accordingly, at the point when the condition for switching the shift mode to the stepped shift mode is satisfied (reference sign d2), the correction value α is set by subtracting the mode-switch threshold X1 from the engine rotation speed Ne, and the upshift threshold X2 is set by adding the correction value α to the mode-switch threshold X1. In the subsequent stepped shift mode, upshifting to the higher fixed transmission gear ratios R3 and R4 is performed (reference signs d5 and d7) every time the engine rotation speed Ne reaches the upshift threshold X2 (reference signs d4 and d6).

Shift Situation: Comparative Example

Figure 12:
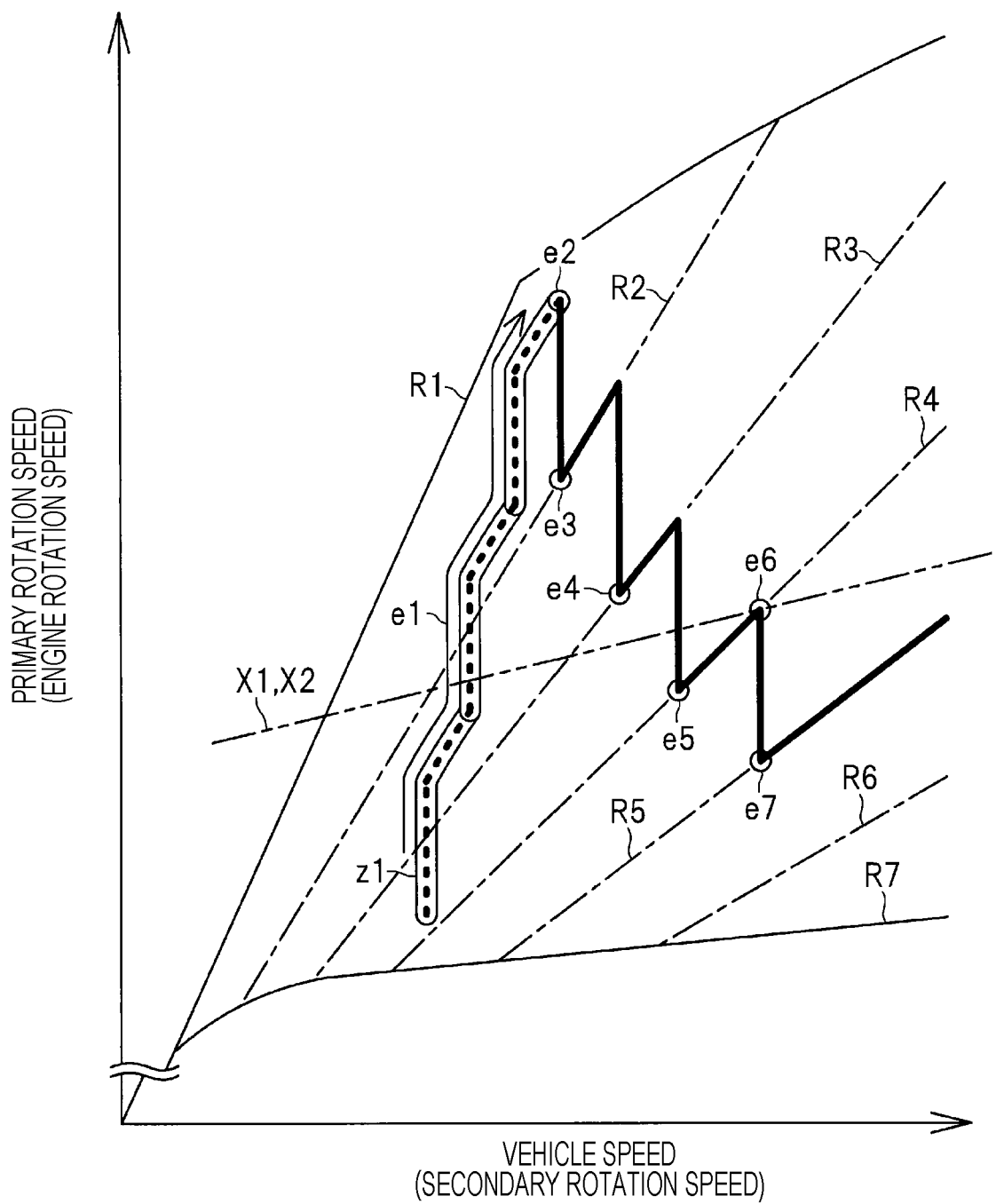
FIG. 12 illustrates an example of a shift situation when the shift mode is switched from the stepless shift mode to the stepped shift mode, in accordance with a comparative example.

FIG. 12 illustrates an example of a shift situation when the shift mode is switched from the stepless shift mode to the stepped shift mode, in accordance with a comparative example. In FIG. 12, the shift situation according to the stepless shift mode is indicated by a dashed line, and the shift situation according to the stepped shift mode is indicated by a solid line.

As indicated by an arrow e1 in FIG. 12, when the accelerator pedal is pressed deeply in the stepless shift mode, kick-down control is executed for quickly accelerating the vehicle 11, so that the engine rotation speed Ne is quickly increased while the transmission gear ratio is quickly controlled toward the lower side. In the example illustrated in FIG. 12, the accelerator pedal is pressed multiple times within a short period of time, and the initial stage z1 of the kick-down control is continued over multiple times. Therefore, even in a situation where the engine rotation speed Ne exceeds the mode-switch threshold X1, the stepless shift mode is maintained without the shift mode being changed. A situation where kick-down control is executed is a situation where the accelerator pedal is pressed by the vehicle occupant and the accelerator opening AP exceeds the opening threshold A1.

Subsequently, when the pressing of the accelerator pedal is kept constant and the initial stage z1 of the kick-down control ends (reference sign e2), the engine rotation speed Ne exceeds the mode-switch threshold X1. In one example, because the condition for switching the shift mode to the stepped shift mode is satisfied, the transmission gear ratio is switched to the second fixed transmission gear ratio R2 (reference sign e3), and the shift mode is switched from the stepless shift mode to the stepped shift mode. In this case, if the upshift threshold X2 is set to the same value as the mode-switch threshold X1 without the upshift threshold X2 being offset higher by using the correction value α, the engine rotation speed Ne significantly exceeds the upshift threshold X2. Therefore, in the stepped shift mode, upshifting to the higher fixed transmission gear ratios R3 and R4 is repeated (reference signs e4 and e5) until the engine rotation speed Ne falls below the upshift threshold X2. In the subsequent stepped shift mode, upshifting to the higher fixed transmission gear ratio R5 is performed (reference sign e7) when the engine rotation speed Ne reaches the upshift threshold X2 (reference sign e6).

Conclusion

As described above, when the shift mode is to be switched from the stepless shift mode to the stepped shift mode, the shift control device 10 sets the correction value α by subtracting the mode-switch threshold X1 from the engine rotation speed Ne, and sets the upshift threshold X2 by adding this correction value α to the mode-switch threshold X1. Then, in the stepped shift mode, the transmission gear ratio of the continuously variable transmission 13 is switched toward the higher side every time the engine rotation speed Ne reaches the upshift threshold X2. Accordingly, the upshift threshold X2 is offset higher than the mode-switch threshold X1, so that even in a case where the shift mode is switched to the stepped shift mode in a situation where the engine rotation speed Ne significantly exceeds the mode-switch threshold X1, excessive upshifting can be avoided. Consequently, the stepped shift mode can be appropriately executed without giving a sense of discomfort to the vehicle occupant or occupants.

As an alternative to the above description in which a value obtained as a result of subtracting the mode-switch threshold X1 from the engine rotation speed Ne is set as the correction value α, a predetermined value may be added to the value obtained as a result of subtracting the mode-switch threshold X1 from the engine rotation speed Ne, and this value may be set as the correction value α. Accordingly, the upshift threshold X2 can be increased, and the acceleration force of the vehicle 11 can be increased. Furthermore, a predetermined value may be subtracted from the value obtained as a result of subtracting the mode-switch threshold X1 from the engine rotation speed Ne, and this value may be set as the correction value α. Accordingly, the upshift threshold X2 can be decreased, and enhanced quietness can be achieved during acceleration. As an alternative to the above description in which kick-down control for actively increasing the vehicle speed is described in a situation where the engine rotation speed Ne significantly exceeds the mode-switch threshold X1 when the shift mode is to be switched from the stepless shift mode to the stepped shift mode, the embodiments of the disclosure can be effectively applied to a case where switching of the shift mode to the stepped shift mode is prohibited due to other control.

The disclosure is not limited to the above embodiments, and various modifications are possible within the scope of the disclosure. For example, in the example illustrated in FIG. 4, seven fixed transmission gear ratios R1 to R7 are indicated as target transmission gear ratios to be used in the stepped shift mode. Alternatively, six or fewer fixed transmission gear ratios may be used, or eight or more fixed transmission gear ratios may be used. Furthermore, in the above description, the mode-switch threshold X1 is set based on the accelerator opening AP and the vehicle speed VSP. Alternatively, for example, the mode-switch threshold X1 may be set based on the accelerator opening AP alone, or the mode-switch threshold X1 may be set based on the vehicle speed VSP alone.

In the above description, the transmission controller 41 is provided with the stepless-transmission-gear-ratio setting unit 60, the stepped-transmission-gear-ratio setting unit 61, the designated-transmission-gear-ratio setting unit 62, the shift-mode selecting unit 63, the control signal generator 64, the mode-switch threshold setting unit 65, the correction-value setting unit 66, and the upshift-threshold setting unit 67. Alternatively, for example, the setting units, the selecting unit, and the generator may be provided in another controller, or the setting units, the selecting unit, and the generator may be provided distributively in a plurality of controllers.

The invention claimed is:

1. A shift control device having a stepless shift mode and a stepped shift mode as shift modes for controlling a continuously variable transmission to be coupled to an engine, the stepless shift mode being a mode in which a transmission gear ratio of the continuously variable transmission is controlled in a stepless fashion, the stepped shift mode being a mode in which the transmission gear ratio of the continuously variable transmission is controlled in a stepwise fashion, the shift control device comprising:
  a mode setting unit configured to switch the shift mode from the stepless shift mode to the stepped shift mode if an engine rotation speed in the stepless shift mode exceeds a switch threshold;
  a correction-value setting unit configured to set a correction value on a basis of the engine rotation speed if the shift mode is to be switched from the stepless shift mode to the stepped shift mode;
  a shift-threshold setting unit configured to set a shift threshold by adding the correction value to the switch threshold if the shift mode is to be switched from the stepless shift mode to the stepped shift mode; and
  an upshift controller configured to switch the transmission gear ratio of the continuously variable transmission toward a higher side when the engine rotation speed in the stepped shift mode reaches the shift threshold.

2. The shift control device according to claim 1,
wherein the mode setting unit switches the shift mode from the stepless shift mode to the stepped shift mode if an accelerator-pedal operated amount exceeds an operation threshold and the engine rotation speed exceeds the switch threshold.

3. The shift control device according to claim 2,
wherein the correction-value setting unit sets the correction value by subtracting the switch threshold from the engine rotation speed if the engine rotation speed in the stepless shift mode exceeds the switch threshold.

4. The shift control device according to claim 2, further comprising:
  a switch-threshold setting unit configured to set the switch threshold on a basis the accelerator-pedal operated amount.

5. The shift control device according to claim 4,
wherein the switch-threshold setting unit sets the switch threshold to a larger value as the accelerator-pedal operated amount increases.

6. The shift control device according to claim 5,
wherein the switch-threshold setting unit sets the switch threshold on a basis of the accelerator-pedal operated amount and a vehicle speed.

7. The shift control device according to claim 6,
wherein the switch-threshold setting unit sets the switch threshold to a larger value as the vehicle speed increases.

8. The shift control device according to claim 4,
wherein the switch-threshold setting unit sets the switch threshold on a basis of the accelerator-pedal operated amount and a vehicle speed.

9. The shift control device according to claim 8,
wherein the switch-threshold setting unit sets the switch threshold to a larger value as the vehicle speed increases.

10. The shift control device according to claim 1,
wherein the correction-value setting unit sets the correction value by subtracting the switch threshold from the engine rotation speed if the engine rotation speed in the stepless shift mode exceeds the switch threshold.

11. The shift control device according to claim 1, further comprising:
a switch-threshold setting unit configured to set the switch threshold on a basis an accelerator-pedal operated amount.

12. The shift control device according to claim 11,
wherein the switch-threshold setting unit sets the switch threshold to a larger value as the accelerator-pedal operated amount increases.

13. The shift control device according to claim 12,
wherein the switch-threshold setting unit sets the switch threshold on a basis of the accelerator-pedal operated amount and a vehicle speed.

14. The shift control device according to claim 13,
wherein the switch-threshold setting unit sets the switch threshold to a larger value as the vehicle speed increases.

15. The shift control device according to claim 11,
wherein the switch-threshold setting unit sets the switch threshold on a basis of the accelerator-pedal operated amount and a vehicle speed.

16. The shift control device according to claim 15,
wherein the switch-threshold setting unit sets the switch threshold to a larger value as the vehicle speed increases.

* * * * *